J. W. MOODY.
MACHINE FOR SHARPENING SAWS.
APPLICATION FILED OCT. 16, 1917.
1,323,085.
Patented Nov. 25, 1919.
4 SHEETS—SHEET 1.
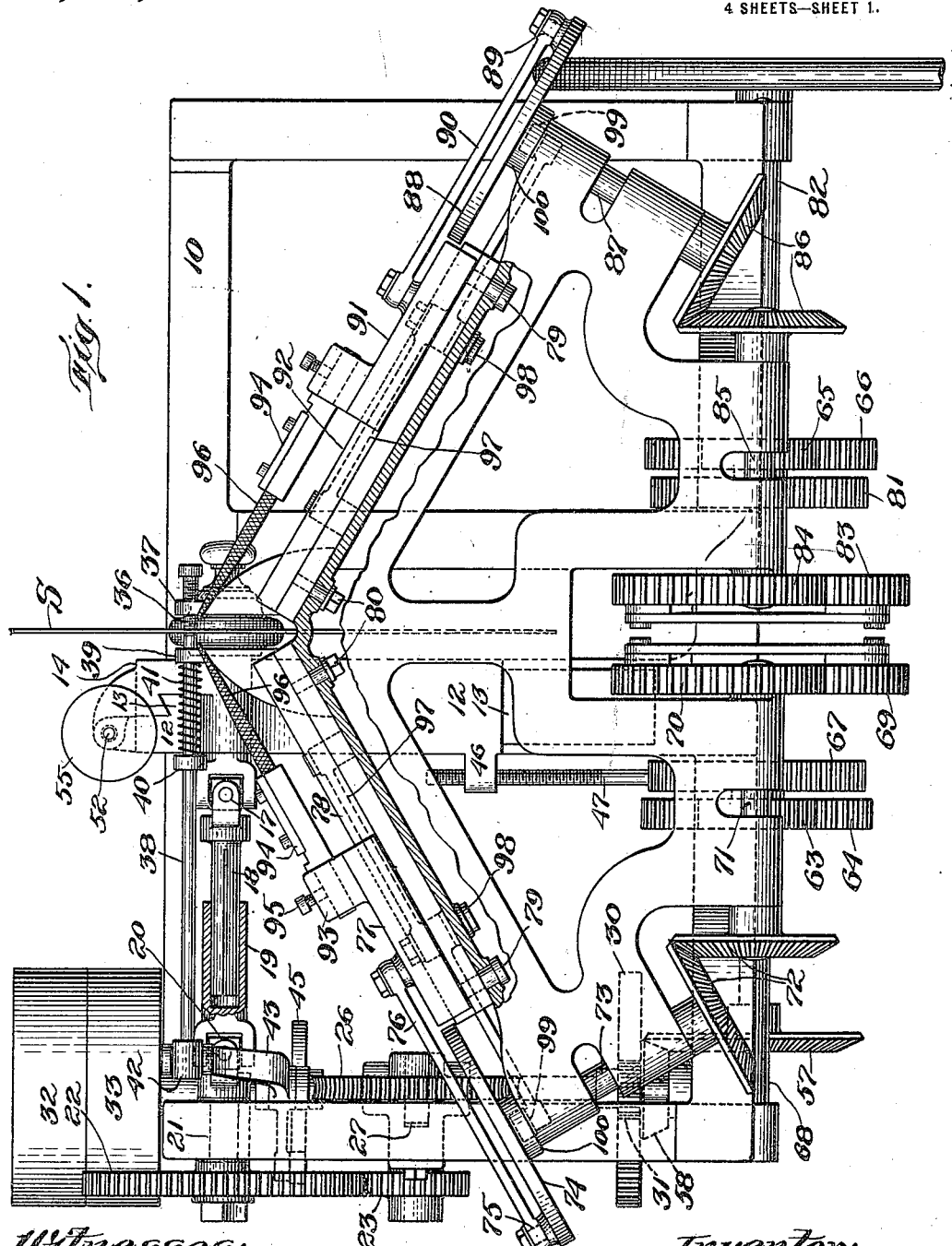
Witnesses:
Josephine H. Ryan
Florence A. Collins
Inventor:
Jesse W. Moody,
by Roberts, Roberts & Cushman
Attys.

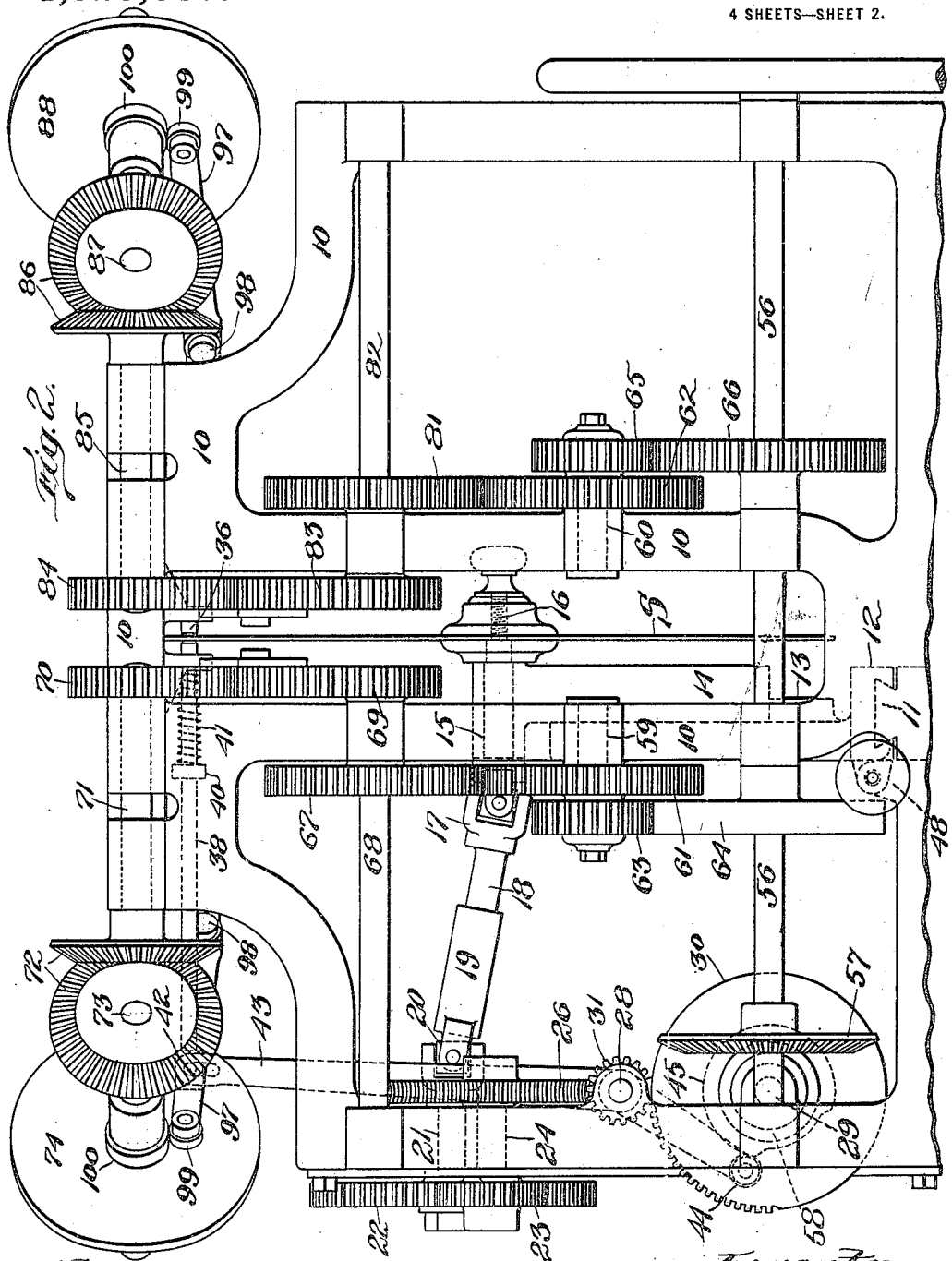

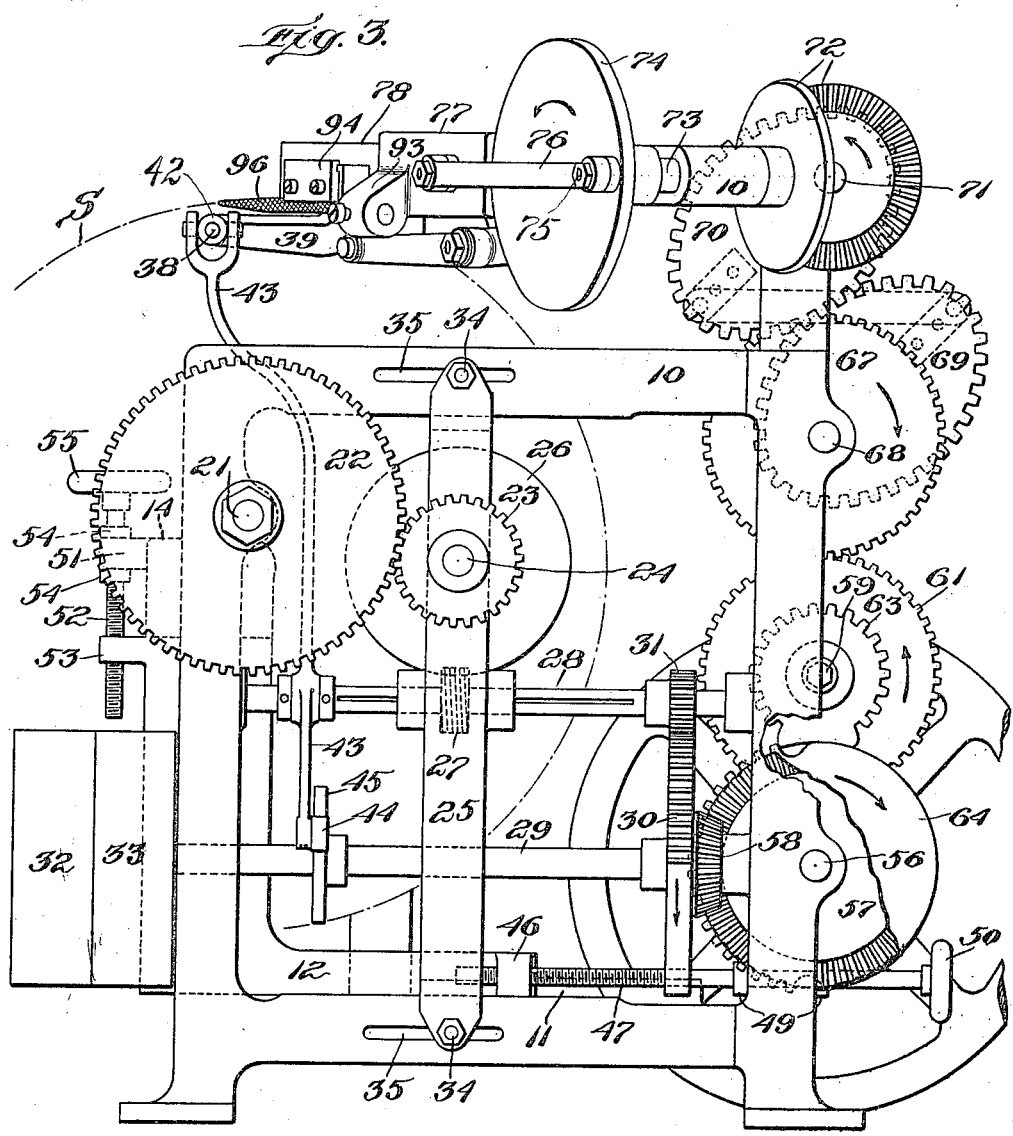

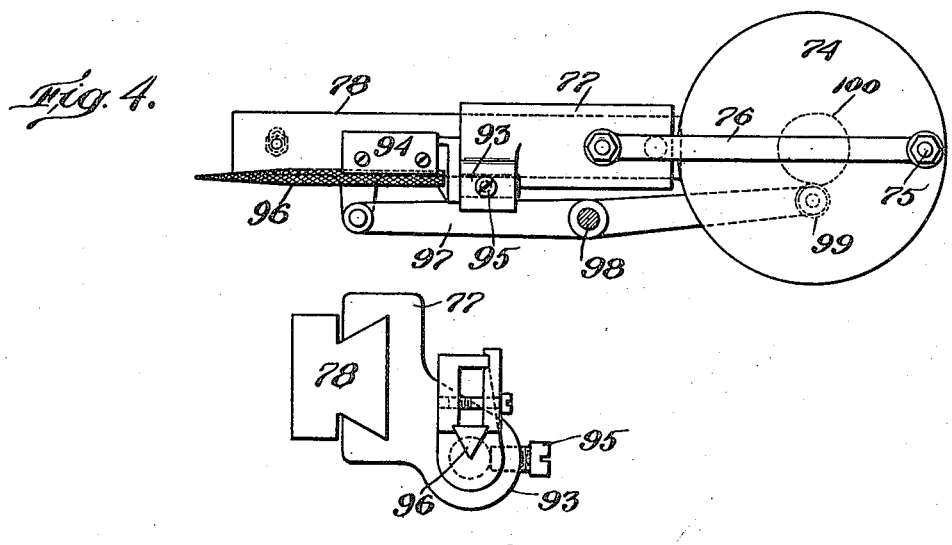

UNITED STATES PATENT OFFICE.

JESSE W. MOODY, OF SOMERVILLE, MASSACHUSETTS.

MACHINE FOR SHARPENING SAWS.

1,323,085.  Specification of Letters Patent.  Patented Nov. 25, 1919.

Application filed October 16, 1917. Serial No. 196,851.

*To all whom it may concern:*

Be it known that I, JESSE W. MOODY, a citizen of the United States, and resident of Somerville, in the county of Middlesex and State of Massachusetts, have invented new and useful Improvements in Machines for Sharpening Saws, of which the following is a specification.

My invention relates to improvements in machines for filing circular saws and has for its object to provide an improved machine of this class which will automatically file all of the teeth of a circular saw.

The invention consists of a saw filing machine embodying the novel features of construction and operation set forth in the following description, and particularly pointed out and defined in the claims at the close thereof.

In the accompanying drawings which illustrate one embodiment of the invention,—

Figure 1 is a plan view of my improved saw filing machine;

Fig. 2 is a front view of the machine shown in Fig. 1;

Fig. 3 is an end view of the machine shown in Fig. 1; and

Figs. 4 and 5 are details hereinafter described.

The machine herein shown is constructed to hold a saw in position to be acted upon by two alternately operated files, arranged at similar angles to the plane of the saw and actuated to file respectively alternate teeth of the saw, while the saw is automatically advanced after each filing stroke to bring the next tooth into position to be filed. The saw to be sharpened is mounted upon a holder that is intermittently actuated so that the saw is rotated step by step to bring the teeth successively into position to be operated upon by the filing devices. Two filing mechanisms are provided, and when a tooth is brought into position to be operated upon, one of the two filing mechanisms is actuated and acts to file that tooth. Then the saw is rotated one step and the other filing mechanism acts to file the next tooth. In this way the filing mechanisms alternate in operations throughout the circumference of the saw.

Referring first to the mechanism for supporting and operating the saws, 10 represents the frame of the machine, on which are provided ways 11 for a horizontally adjustable slide 12. The slide 12 is provided with vertical ways 13 for a vertically adjustable slide 14 carrying at its upper end an arbor 15. At one end the arbor 15 is reduced in size and threaded to receive upon it the saw S, and a nut 16, by means of which the saw is secured rigidly to the end of the arbor. At its opposite end the arbor 15 is connected by a universal joint 17 with a shaft section 18 which slides within a sleeve section 19, to which it is keyed, so that said telescoping parts 18 and 19 can be lengthened or shortened but will rotate together as one part. The end of the sleeve 19 is connected by a universal joint 20 with an arbor 21 journaled on the frame of the machine. To one end of said arbor 21 is removably secured a gear 22 that is driven by a pinion 23. Pinion 23 is fast to one end of an arbor 24 journaled in a frame 25, and carries at its inner end a worm gear 26 which is driven by a worm 27, splined to a shaft 28, journaled in bearings on frame 10. Shaft 28 is driven by the prime power shaft 29 through intermittent gears 30 and 31. The gears 30 and 31 are constructed so that shaft 28 is rotated once for each revolution of the shaft 29, such complete revolution of shaft 28 being effected during a quarter revolution of shaft 29, while during the rest of the revolution of shaft 29, shaft 28 remains stationary. The shaft 29 is provided with fast and loose pulleys 32 and 33, through which power is applied. Each time shaft 28 is rotated it acts through worm 27, gear 26, shaft 24, pinion 23 and gear 22 to rotate or advance the saw S the distance of one tooth. The purpose of making the gear 22 removable on the arbor 21 is so that by removing said gear and substituting another of appropriate size the angular movement of arbor 21 may be suited to the saw being operated upon. The frame 25 is fastened to the frame 10 by means of bolts 34 extending through slots 35 in the frame 10, so that when a change is made in the gear 22, the frame 25 may be adjusted toward or from arbor 21 as may be required.

Between its step-by-step movements thus effected, the saw S is clamped, and held against undue yielding or chattering under the stroke of the file, by a pair of clamping jaws. One of said jaws, the fixed jaw, as herein shown, consists of a screw 36 adjustably mounted in an arm 37 on the frame 10.

Jaw 36 bears against one side of the saw S, and at the opposite side is a movable jaw or clamp consisting of a plunger 38 slidably mounted in an arm 39 projecting from frame 10, and having fixed thereon a collar 40, between which and arm 39 there is provided a spring 41, which tends to shift the plunger 38 away from jaw 36. The outer end of plunger 38 has fixed to it a sleeve 42, to which is pivotally connected the upper end of a lever 43, fulcrumed on the shaft 28, and provided at its lower end with a cam roll 44, coöperating with the cam 45 on the prime power shaft 29. Cam 45 and gear 30 are constructed and timed so that during the feeding movement of the saw S, plunger 38 is held retracted by its spring 41, but during the operation of the files presently to be described, the plunger 38 is held forcibly against saw S so as to clamp it firmly against jaw 36 by the cam 45.

In order to accommodate saws of different diameters, the arbor 15, which is mounted upon the two adjustable slides 12 and 14, may be adjusted both vertically and horizontally to place said arbor in position properly to support the saw with relation to the filing mechanisms and the clamps 36, 38. The slide 12 is made with a lug 46 through which extends a threaded shaft 47, which also extends through a bearing 48 on frame 10, and at each side of this bearing shaft 47 has a collar 49 fixed to it. At its outer end shaft 47 carries a hand-wheel 50, by means of which it may be manually rotated to shift slide 12 horizontally on the ways 11. The vertically adjustable slide 14 is provided with a lug 51, through which extends a threaded shaft 52, which is threaded into a lug 53 on slide 12. Shaft 52 has collars 54 fixed to it, one at each side of lug 51, and at its upper end carries a hand-wheel 55, through which said shaft can be manually rotated to adjust slide 14 vertically, as the diameter of the saw to be operated upon may require.

Referring now to the filing mechanism: In the lower part of the machine is a shaft 56, on which is fixed a beveled gear 57, which is continuously driven by a beveled pinion 58 fast on prime power shaft 29, pinion 58 being half the diameter of gear 57. From shaft 56 the two sets of filing devices are alternately actuated through the mechanisms which I will now describe.

Projecting from frame 10 above shaft 56 are two studs 59 and 60, on which are rotatively mounted two gears 61 and 62, the gear 61 being connected through intermittent gears 63 and 64 with the shaft 56, while the gear 62 is connected through intermittent gears 65 and 66 with shaft 56. The two sets of intermittent gears 63, 64 and 65, 66, are constructed exactly alike, but are timed 180° apart so that during one half of the revolution of shaft 56, gear 63 has one complete revolution imparted to it, and during the other half of the revolution of shaft 56 the gear 65 has one complete revolution imparted to it. The gear 61 is compounded with the gear 63 and when rotated with the latter imparts one revolution to a gear 67 with which it meshes, the latter being fixed to a shaft 68 journaled on frame 10.

Shaft 68 has fixed to it an elliptical gear 69, meshing with an elliptical gear 70 fast on a shaft 71, journaled on frame 10. Shaft 71 is connected through a pair of beveled gears 72 with a shaft 73, carrying at one end a disk 74 provided with a crank pin 75. Crank pin 75 is connected by a rod or link 76 with a carriage 77, slidably mounted on a support 78 in the form of a bar, pivoted at 79 to frame 10, and provided with a stud 80 near its opposite end which holds said end against frame 10, but with provision for slight vertical movement.

The gear 62 is compounded with the gear 65, and when the latter is rotated the gear 62 imparts one revolution to a gear 81 fast on a shaft 82 journaled on frame 10, which also carries an elliptical gear 83. This elliptical gear 83 drives an elliptical gear 84 fast on a shaft 85 journaled on frame 10. Shaft 85 is connected through a pair of beveled gears 86 with a shaft 87, on which is fixed a disk 88 provided with a crank pin 89 connected by a link or rod 90 with a carriage 91 slidably mounted upon a support 92. The support 92 is connected with frame 10 through a pivot 79 and stud 80, in the same manner in which support 78 is connected with said frame.

The carriages 77 and 91 are each made with a socket piece 93 to receive the shank of a file holder 94, which is removably secured in said socket by a screw 95. In each holder 94 is secured a three-cornered file 96.

When shaft 56 makes the first half of its revolution it acts through one set of the above described connection, including elliptical gears 69 and 70, to impart one complete revolution to crank disk 74. Disk 74 acts through the connections described to reciprocate the carriage 77 and move the file forward across the saw S and then back again to the point from which it started. During the last half of the revolution of shaft 56, it acts through the connections described, including elliptical gears 83 and 84 to impart one complete revolution to disk 88 which reciprocates the other carriage 96 and moves the opposite file forward across the saw S, and then back again to its starting point. It will be understood that during the strokes of the files the saw is held stationary, and between said strokes the saw is advanced step by step in the manner already described to bring a new saw tooth into the path of the file next to be actuated. The files are angularly arranged as shown, and each file cuts alternate saw teeth, thus giving the teeth alternately beveled edges.

One of the peculiar features of this invention consists in employing two sets of intermittent and alternately operated elliptical gears, and in having them so timed with relation to the intermittent driving means from shaft 28 that the teeth of shortest radius of gear 70 or 84 are acted upon by the teeth of longest radius of gears 69 and 83 during the return stroke of the corresponding file, so that for three quarters of the time consumed by the revolution of either gear 69 or 83 the file actuated thereby is moved forward or projected, and during one quarter of said time of said revolution of gear 69 or 83 said file is retracted. This imparts a slow or retarded forward or operative movement to the file and a quick return movement, which not only imitates the stroke given in hand filing but withdraws the file 96 back out of the path of the saw teeth before intermittent gear 30 actuates shaft 28 to rotate the saw one step.

During the forward movement of each file the file occupies a relatively depressed position so as to engage the saw S, but during this return stroke it is shifted into an elevated position clear of the saw so that it is not in engagement with the latter as it returns to its normal position. In order to effect this raising and lowering of the file, the supports 78 and 92 are each pivotally connected with a lever 97, fulcrumed at 98 on the frame of the machine and carrying at one end a cam roll 99. The lever 97 of support 92 is operated by a cam 100 on shaft 87, while the lever 97 of support 78 is operated by a corresponding cam 100 on shaft 73. When either file 96 completes its forward stroke, its cam 100 acts through the corresponding lever 97 to swing its support 78 or 92 upward on its pivot, so that the return stroke of the file is made clear of the saw.

I claim:—

1. In a machine for sharpening saws, a saw holder, means for reciprocating the saw holder vertically, means for reciprocating the saw holder horizontally in the plane of the saw, and filing mechanism for acting intermittently on the saw teeth.

2. In a machine for sharpening saws, a saw holder, a file, and mechanism to reciprocate the file across the saw teeth, said mechanism being adapted to impart to the file a relatively slow movement during its operative stroke and a relatively rapid movement during its return stroke, and means to oscillate the file about an axis transverse of its path of reciprocation to lift the file out of engagement with the saw teeth during its return stroke.

3. In a machine for sharpening saws, a saw holder, two filing mechanisms adapted to act on the saw teeth alternately and intermittently, said saw holder being adjustable with relation to the filing mechanisms to admit of filing saws of different sizes, and mechanism automatically to rotate the saw step-by-step to present different teeth successively to the action of the filing mechanisms.

4. In a machine for sharpening saws, a saw holder, means for reciprocating the saw holder both vertically and horizontally in the plane of the saw, two files adapted to act on the saw teeth, and means for reciprocating each of the files over the saw teeth, said means being respectively disposed on opposite sides of the plane of the saw.

5. In a machine for sharpening saws, a saw holder, means for reciprocating the saw holder both vertically and horizontally in the plane of the saw, two files adapted to act on the saw teeth, and means for reciprocating each of the files over the saw teeth along paths oblique to the plane of the saw.

6. In a machine for sharpening saws, a saw holder, a file, mechanism to reciprocate the file across the saw teeth, said mechanism being adapted to impart to the file a relatively slow movement during its operative stroke and a relatively quick movement during its return stroke, and mechanism automatically to advance the saw step-by-step between the reciprocations of said file, to present different teeth successively to the action of the file.

7. In a machine for sharpening saws, a saw holder, a file, mechanism to reciprocate the file across the saw teeth, said mechanism including elliptical gears adapted to impart to the file a relatively slow movement during its operative stroke and a relatively quick movement during its return stroke, and mechanism automatically to advance the saw step-by-step between the reciprocations of said file, to present different teeth successively to the action of the file.

8. In a machine for sharpening saws, a saw holder, a file, mechanism to reciprocate the file across the saw teeth, means to oscillate the file about an axis transverse of its path of reciprocation to lift the file out of engagement of the saw teeth during its return stroke, and mechanism automatically to advance the saw step-by-step between the strokes of the file to present different teeth successively to the action of the file.

9. In a machine for sharpening circular saws, a rotatable saw holder, filing mechanism for acting intermittently on the saw teeth, said saw holder being adjustable with relation to the filing mechanism to admit of the filing of saws of different sizes, actuating mechanism automatically to rotate said saw holder step-by-step between the operations of said filing mechanism to present different teeth successively to the action of the filing mechanism, and a flexible driving connection between said step-by-step actuating mechanism and said adjustable saw holder.

10. In a machine for sharpening saws, a saw holder, filing mechanism for acting intermittently on the saw teeth, mechanism automatically to advance the saw step-by-step to present different teeth successively to the action of the filing mechanism, and clamping jaws adapted automatically to engage and support the saw during action of the filing mechanism and to release the saw during the step-by-step movements of the saw.

11. In a machine for sharpening saws, a saw holder, a file, mechanism to reciprocate the file across the saw teeth, said mechanism including a driving elliptical gear and a driven elliptical gear, the segment of the driving elliptical gear of relatively shorter radii adapted to impart to the file a relatively slow movement during its operative stroke, and the segment of the driving elliptical gear of relatively longer radii adapted to impart to the file a relatively quick movement during its return stroke, and mechanism automatically to advance the saw step-by-step between the reciprocations of said file, to present different teeth successively to the action of the file.

Signed by me at Boston, Massachusetts, this 2nd day of June, 1913.

JESSE W. MOODY.

Witnesses:
 ROBERT CUSHMAN,
 FLORENCE A. COLLINS.